US010423935B2

(12) United States Patent
Jones et al.

(10) Patent No.: US 10,423,935 B2
(45) Date of Patent: Sep. 24, 2019

(54) SYSTEMS AND METHODS OF ANALYZING RECYCLED PRODUCTS TO DETECT TRENDS AND ADJUST INVENTORY BASED ON THE TRENDS

(71) Applicant: Walmart Apollo, LLC, Bentonville, AR (US)

(72) Inventors: Matthew A. Jones, Bentonville, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 77 days.

(21) Appl. No.: 15/855,287

(22) Filed: Dec. 27, 2017

(65) Prior Publication Data
US 2018/0189751 A1 Jul. 5, 2018

Related U.S. Application Data

(60) Provisional application No. 62/440,045, filed on Dec. 29, 2016.

(51) Int. Cl.
| | |
|---|---|
| *G06Q 10/00* | (2012.01) |
| *G06Q 10/08* | (2012.01) |
| *G06K 7/10* | (2006.01) |
| *G06K 17/00* | (2006.01) |
| *G06Q 30/06* | (2012.01) |

(52) U.S. Cl.
CPC ............ *G06Q 10/30* (2013.01); *G06Q 10/087* (2013.01); *G06K 7/10861* (2013.01); *G06K 17/0022* (2013.01); *G06Q 30/0601* (2013.01); *Y02W 90/20* (2015.05)

(58) Field of Classification Search
CPC .. G06Q 10/30; G06Q 10/087; G06Q 30/0601; Y02W 90/20; G06K 7/10861; G06K 17/0022

See application file for complete search history.

(56) References Cited

U.S. PATENT DOCUMENTS

| | | | |
|---|---|---|---|
| 6,718,343 B2 | 4/2004 | Kamata | |
| 6,811,030 B1 | 11/2004 | Compton | |
| 8,738,423 B2 | 5/2014 | Lyle | |
| 2008/0306813 A1 | 12/2008 | Romansky | |

(Continued)

FOREIGN PATENT DOCUMENTS

WO 2006021619 3/2006

OTHER PUBLICATIONS

Terry, Lisa; "Managing Retail Returns: The Good, The Bad, and the Ugly"; http://www.inboundlogistics.com/cms/article/managing-retail-returns-the-good-the-bad-and-the-ugly/; Feb. 28, 2014; pp. 1-7.

*Primary Examiner* — Sonji N Johnson
(74) *Attorney, Agent, or Firm* — Fitch, Even, Tabin & Flannery LLP

(57) ABSTRACT

In some embodiments, methods and systems are provided that include a scanner for scanning products recycled by consumers at a retail facility and an electronic inventory management device to analyze the scan data obtained by this scanner in order to determine consumer trends with respect to the recycled products and to determine whether the consumer-recycled products are associated with a trends that warrants one or more adjustments to the inventory at the retail facility.

20 Claims, 3 Drawing Sheets

(56) References Cited

U.S. PATENT DOCUMENTS

| | | | |
|---|---|---|---|
| 2010/0169231 A1* | 7/2010 | Bowles | G06Q 10/30 705/306 |
| 2014/0012643 A1 | 1/2014 | Behrisch | |
| 2015/0095103 A1 | 4/2015 | Rajamani | |

* cited by examiner

SYSTEMS AND METHODS OF ANALYZING RECYCLED PRODUCTS TO DETECT TRENDS AND ADJUST INVENTORY BASED ON THE TRENDS

CROSS-REFERENCE TO RELATED APPLICATION

This application claims the benefit of U.S. Provisional Application No. 62/440,045, filed Dec. 29, 2016, which is incorporated herein by reference in its entirety.

TECHNICAL FIELD

This invention relates generally to analyzing products recycled by consumers and, in particular, to systems and methods detecting trends in the recycled products.

BACKGROUND

Consumers often recycle products purchased from retailers after the products are no longer usable. Products recycled by consumers are typically processed in order to convert them into a new product that can again be offered for sale by a retailer. However, simply reprocessing and repurposing the products recycled by the consumers does not take advantage of the vast amounts of consumer product usage trends represented by the consumer-recycled products.

BRIEF DESCRIPTION OF THE DRAWINGS

Disclosed herein are embodiments of systems, apparatuses, and methods pertaining to analysis of products recycled by consumers at a retail facility to determine trends in the recycled products and adjustment of inventory at the retail facility based on the determined trends. This description includes drawings, wherein.

Figure 1:
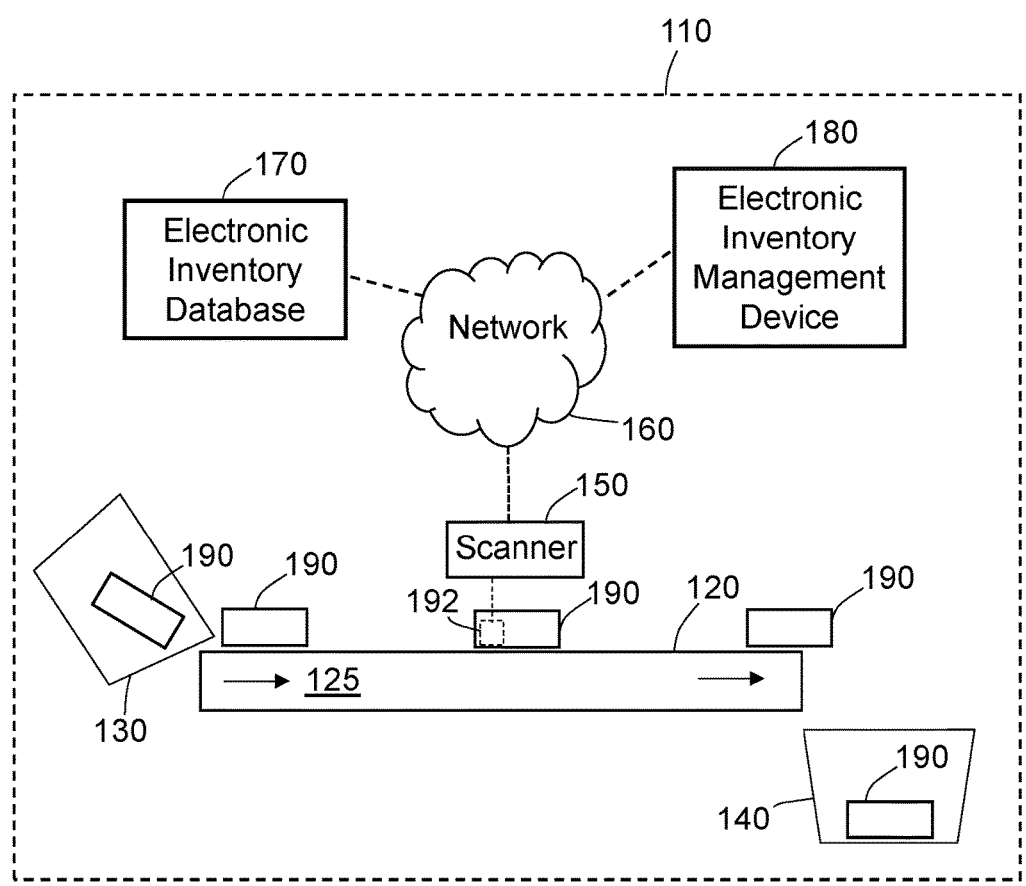
FIG. 1 is a diagram of analyzing products recycled by consumers at a retail facility to determine trends in the recycled products and adjusting inventory at the retail facility based on the determined trends in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for analyzing products recycled by consumers at a retail facility to determine trends in the recycled products and adjust inventory at the retail facility based on the determined trends.

In one embodiment, a system for analyzing products recycled by consumers at a retail facility of a retailer to determine trends in the recycled products and adjust inventory at the retail facility based on the determined trends includes a scanner at or near the retail facility configured to scan identifying indicia of the recycled products and generate scan data and an electronic inventory management database in communication over a network with the scanner and configured to obtain the scan data from the scanner. The electronic inventory management database includes: inventory data associated with products offered for sale at the retail facility and including data identifying the products offered for sale at the retail facility; the scan data associated with the recycled products scanned by the scanner and including the identifying indicia scanned by the scanner; and trend data including a total number of times the recycled products were scanned by the scanner and predetermined scan data thresholds associated with the recycled products scanned by the scanner that, if exceeded, indicate a presence of consumer trends, in association with the recycled products scanned by the scanner, that support an adjustment of the inventory at the retail facility. The system further includes a processor-based electronic inventory management device in communication over the network with the scanner and the electronic inventory management database, the electronic inventory management device being configured to: obtain the scan data, the inventory data, and the trend data from the electronic inventory management database to determine whether at least one recycled product identified based on the obtained scan data is offered for sale at the retail facility, and to determine whether a total number of times products identical to the at least one recycled product were scanned by the scanner at the retail facility within a predetermined time interval exceeds a predetermined scan data threshold stored in the electronic inventory management database in association with the at least one recycled product scanned by the scanner; and generate an output, based on a determination of whether the determined total number exceeds the predetermined scan data threshold and whether a consumer trend is present, in association with the at least one recycled product scanned by the scanner, that warrants the adjustment of the inventory at the retail facility, the output indicating whether the adjustment of the inventory at the retail facility is warranted based on the consumer trend is present in association with the at least one recycled product.

In some embodiments, a method for analyzing products recycled by consumers at a retail facility of a retailer to determine trends in the recycled products and adjust inventory at the retail facility based on the determined trends includes: providing a scanner at or near the retail facility configured to scan identifying indicia of the recycled products and generate scan data; providing an electronic inventory management database in communication over a network with the scanner and configured to obtain the scan data from the scanner and including: inventory data associated with products offered for sale at the retail facility and including data identifying the products offered for sale at the retail facility; the scan data associated with the recycled products scanned by the scanner and including the identifying indicia scanned by the scanner; trend data including a total number of times the recycled products were scanned by the scanner and predetermined scan data thresholds associated with the recycled products scanned by the scanner that, if exceeded, indicate a presence of consumer trends, in association with the recycled products scanned by the scanner, that support an adjustment of the inventory at the retail facility; and providing a processor-based electronic inventory management device in communication over the network with the scanner and the electronic inventory management database, the electronic inventory management device being configured to: obtain the scan data, the inventory data, and the trend data from the electronic inventory management database to determine whether at least one recycled product identified based on the obtained scan data is offered for sale at the retail facility, and to determine whether a total number of times products identical to the at least one recycled product were scanned by the scanner at the retail facility within a predetermined time interval exceeds a predetermined scan data threshold stored in the electronic inventory management database in association with the at least one recycled product scanned by the scanner; and generate an output, based on a determination of whether the determined total number exceeds the predetermined scan data threshold and whether a consumer trend is present, in association with the at least one recycled product scanned by the scanner, that warrants the adjustment of the inventory at the retail facility, the output indicating whether the adjustment of the inventory at the retail facility is warranted based on the consumer trend is present in association with the at least one recycled product.

FIG. 1 shows an embodiment of a system 100 for analyzing products 190 recycled by consumers at a retail facility 110 of a retailer to determine trends in the recycled products 190 and adjust inventory at the retail facility 110 based on the determined trends. The exemplary system 100 of FIG. 1 includes a scanner 150 that scans the products 190 that were recycled by consumers and a conveyor 120 that moves the consumer-recycled products 190 along a product advancement surface 125 such that the scanner 150 scans the products 190 as they move on the conveyor 120. While this application refers to products 190, it will be appreciated that the scanner 150 of the system 100 may be used to scan and analyze products that are retained in packages, boxes, and/or totes, as well as loose products that are not packaged. Further, the size of the products 190 in FIG. 1 has been shown by way of example only, and it will be appreciated that the conveyor 120 may transport various different products 190 having many different sizes and shapes.

The exemplary system 100 shown in FIG. 1 for simplicity of illustration with a conveyor 120 having three consumer-recycled products 190 thereon, but it will be appreciated that the system 100 may be implemented via more than one (e.g., two or more) conveyor 120. It will be appreciated that the conveyor 120 is an optional component of system 100. In other words, the system 100 can be implemented without the conveyor 120, such that products 190 recycled by the consumers are scanned by the scanner 150 while they are not moving on a product advancement surface 125 of the conveyor 120. For example, the products 190 recycled by the consumer can be scanned by the scanner 150 while they are located in a recycling bin 130 (or in another container, or in a pile in a product processing/recycling area of the retail facility 110). Alternatively, the products 190 can be taken out by a worker or a robotic arm from the recycling bin 130, scanned via the scanner 150, and placed back into the same recycling bin 130 or a different recycling bin.

The exemplary system 100 of FIG. 1 has been illustrated as including two recycling bins 130, 140. The recycling bin 130 can be a bin that was placed, for example, at an entrance or in the parking lot of the retail facility 110, such that the consumer can drop off the products 190 that they desire to recycle. Alternatively, the recycling bin 130 can be a bin that is used to consolidate the consumer-recycled products 190 from multiple recycling bins that were placed at the entrance or in the parking lot of the retail facility 110. In some embodiments, the products 190 that were deposited into the recycling bin 130 (or other recycling bins) by the consumers at the retail facility 110 are emptied onto the conveyor 120 from the recycling bin 130 such that the products 190 travel on the product advancement surface 125 of the conveyor 120 and fall into a second recycling bin 140, as shown in FIG. 1. It will be appreciated that the recycling bins 130, 140 are shown in FIG. 1 for illustration purposes only and are optional components of system 100. In other words, in some embodiments, the products 190 are not placed onto the conveyor 120 by being emptied out of a recycling bin 130, but are placed onto the conveyor 120 manually by a worker, or by a robotic arm. In some embodiments, the products 190 do not fall off the conveyor 120 into the recycling bin 140, but may be picked off by a worker, a robotic arm, or may be transported via the conveyor 120 to a product recycling or disposal area of the retail facility 110.

The exemplary conveyor has a product advancement surface 125 configured to move one or more products 190 in a direction indicated by the directional arrows as shown in FIG. 1. The product advancement surface 125 of the conveyor 120 may be comprised of a single conveyor belt surface (as shown in FIG. 1), or may be instead comprised of a series of two or more independently movable conveyor belt surfaces. As such, one section of the product advancement surface of conveyor 120 may be stopped while the other one is permitted to move. The conveyor 120 may be a belt conveyor, chain conveyor, or the like, and may have a continuous, uninterrupted product advancement surface 125, or may have a product advancement surface 125 that includes one or more interruptions at the transitions between the distinct conveyor surfaces.

The exemplary scanner 150 depicted in FIG. 1 is configured to scan the products 190 that were recycled by the consumers at the retail facility 110. In some embodiments, the scanner 150 may include, but is not limited to a barcode (e.g., UPC, EAN, GTIN12, GTIN 13, or the like) reader, quick response (QR) code reader, optical reader, radio frequency identification (RFID) reader, stock keeping unit (SKU) reader, near field communication (NFC) reader, video capture-enabled device (e.g., camera or the like) electronic tablet, cellular phone, or the like mobile electronic device. In some aspects, the scanner 150 is a stationary device mounted in proximity to the conveyor 120 to scan the products 190 moving on the product advancement surface 125 thereof. In other aspects, the scanner 150 is a mobile (e.g., hand-held) electronic device that can scan the products 190 while they are moving on the product advancement surface of the conveyor 120, or while they are stacked in the recycling bin 130 or another area of the retail facility 110.

In some embodiments, the scanner 150 shown in FIG. 1 is configured to scan identifying indicia 192 of the recycled products 190 and to generate scan data based on the scan. In some embodiments, the scanner 150 is configured to scan identifying indicia 192 located on the products 190 or on the packaging containing the products 190, as shown in FIG. 1. For ease of illustration, only the product 190 being scanned by the scanner 150 is shown as having an identifying indicia 192 thereon, but it will be appreciated that each product 190 includes identifying indicia 192 thereon in order to enable the scanner 150 to scan and facilitate the identification of each product 190 traveling on the conveyor 120. The identifying indicia 192 on the products 190 that may be scanned by the scanner 150 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes.

In the exemplary system 100 depicted in FIG. 1, the scanner 150 is positioned proximate the product advancement surface 125 of the conveyor 120, and more specifically, above the product advancement surface 125 of the conveyor 120 and above the products 190 moving on the product advancement surface 125 of the conveyor 120. It will be appreciated, however, that in some embodiments, the scanner 150 is positioned below the product advancement surface 125, or on one or both sides of the product advancement surface 125. In other words, the location of the scanner 150 relative to the conveyor 120 in FIG. 1 is shown by way of example only, and one or more scanners 150 may be placed at one or more different locations proximate the product advancement surface 125 of conveyor 120 to enable the scanner 150 to scan the identifying indicia 192 on the products 190 as the products 190 are moving along the product advancement surface 125 of the conveyor 120. Furthermore, it will be appreciated that the scanner 150 can be physically incorporated (e.g., coupled to, embedded, etc.) into the physical structure of the conveyor 120 and/or the product advancement surface 125. For example, in some embodiments, the conveyor 120 includes two independently movable conveyor belt surfaces with the scanner 150 being positioned therebetween, such that a product 190 is permitted to first move on and along an upper-facing surface of the first conveyor belt, then on and along an upper-facing surface of the scanner 150, and then on and along an upper-facing surface of the second conveyor belt.

In the embodiment shown in FIG. 1, the system 100 includes an electronic inventory management database 170. The electronic inventory management database 170 is in communication over the network 160 with the scanner 150 and is configured to obtain the scan data from the scanner 150 (directly or via an electronic inventory management device 180). In some embodiments, the exemplary electronic inventory management database 170 of FIG. 1 is configured to store scan data associated with the consumer-recycled products 190 moving on the conveyor, inventory data associated with the products stocked at the retail facility 110, and consumer trend data associated with the consumer-recycled products 190.

The electronic inventory management database 170 and the electronic inventory management device 180 can be implemented as two separate physical devices in the same physical location as the conveyor 120 as shown in FIG. 1. It will be appreciated that the electronic inventory management database 170 and the electronic inventory management device 180 may be implemented as a single physical device, and may be located at different locations relative to each other and relative to the conveyor 120. The electronic inventory management database 170 may be stored, for example, on non-volatile storage media (e.g., a hard drive, flash drive, or removable optical disk) internal or external to the electronic inventory management device 180, or internal or external to computing devices distinct from the electronic inventory management device 180. In some embodiments, the electronic inventory management database 170 may be cloud-based.

In one aspect, the electronic inventory management database 170 stores inventory data associated with products offered for sale at the retail facility 110 and including data identifying the products offered for sale at the retail facility 110. For example, inventory data that can be stored in the electronic inventory management database 170 can include but is not limited to: number of products in stock (e.g., on the sales floor and/or in a stock room) at the retail facility 110; price of each product in stock at the retail facility 110; consumer purchase history (number of units sold and dates when sold) of each product stocked at the retail facility 110; and prices of certain products offered for sale by at least one competitor of the retailer facility.

In some embodiments, the electronic inventory management database 170 stores scan data associated with the recycled products 190 scanned by the scanner 150. Scan data stored in the electronic inventory management database 170 can include but is not limited to: identifying indicia (e.g., barcode, RFID and/or other identifying indicia) of the consumer-recycled products 190 that were scanned by the scanner 150 during movement on the conveyor 120; date of purchase of the consumer-recycled products 190 (if available); price of purchase of the consumer-recycled products 190 (if available); and number of units of the products 190 that have been recycled by the consumers at the retail facility 110 during a predetermined interval of time (e.g., 1 day, 1 week, 1 month, 3 months, 6 months, 1 year, etc.).

In some embodiments, the electronic inventory management database 170 stores trend data associated with the recycled products 190 scanned by the scanner 150. Trend data stored in the electronic inventory management database 170 can include but is not limited to: a total number of times the consumer-recycled products 190 were scanned by the scanner 150; predetermined scan data thresholds associated with the consumer-recycled products 190 scanned by the scanner 150 which, if exceeded, indicate a presence of consumer trends in association with such consumer-recycled products 190 that support an adjustment of product inventory at the retail facility 110 (e.g., adding this consumer-recycled product 190 to the product inventory of the retail facility 110, lowering the price of a product offered for sale at the retail facility 110 that happens to be a competing/alternative product relative to the consumer-recycled product 190).

The exemplary system 100 of FIG. 1 further includes an electronic inventory management device 180 configured to communicate over the network 160 with the scanner 150 and the electronic inventory management database 170. The electronic inventory management device 180 may be a stationary or portable electronic device, for example, a desktop computer, a laptop computer, a tablet, a mobile phone, or any other electronic device including a processor-based control circuit (i.e., control unit). In the embodiment of FIG. 1, the electronic inventory management device 180 is configured for data entry and processing as well as for communication with other devices of system 100 via the network 160 which may be a wide-area network (WAN), a local area network (LAN), a personal area network (PAN), a wireless local area network (WLAN), or any other internet or intranet network, or combinations of such networks. The electronic inventory management device 180 may be located at the same location as the conveyor 120 and/or the electronic inventory management database 170, or may be located at a remote location relative to the conveyor 120 and/or the electronic inventory management database 170.

Figure 2:
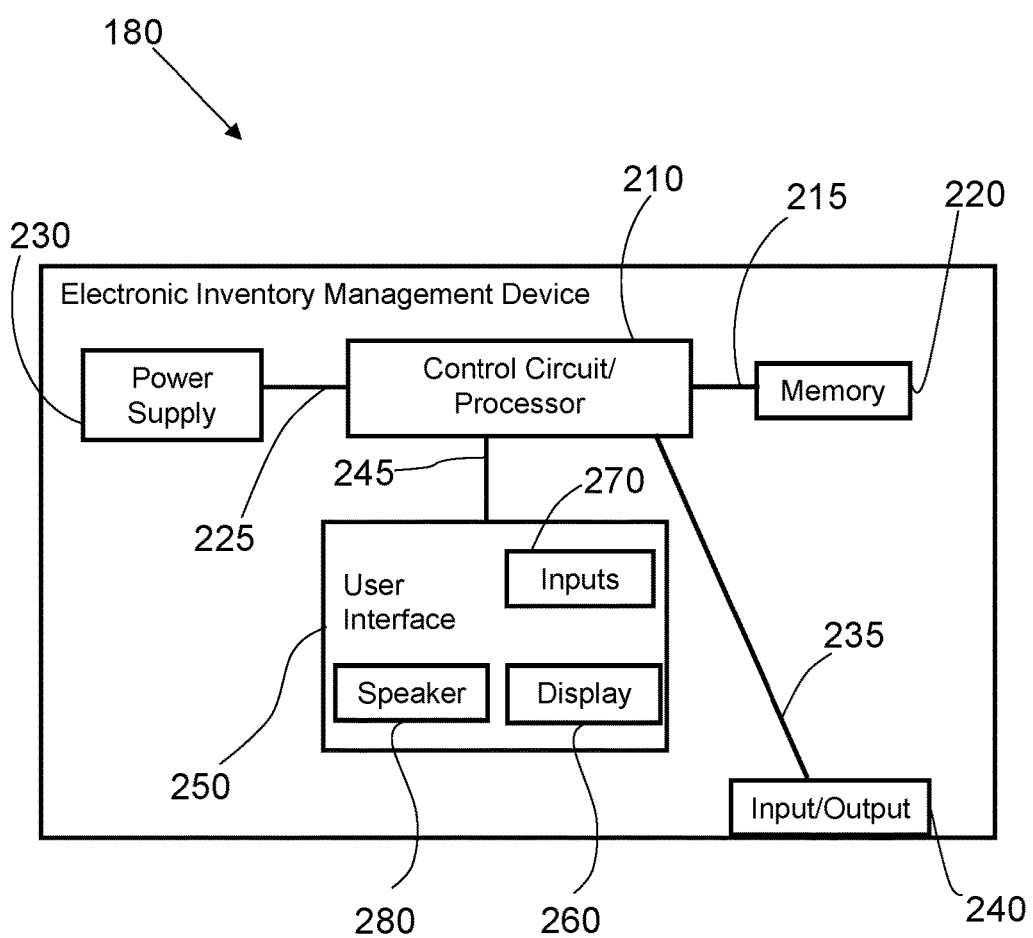
FIG. 2 is a functional diagram of an exemplary electronic inventory management device usable with the system of FIG. 1 in accordance with some embodiments.

With reference to FIG. 2, the electronic inventory management device 180 configured for use with exemplary systems and methods described herein may include a control unit or control circuit 210 including a processor (e.g., a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the electronic inventory management device 180 is also electrically coupled via a connection 235 to an input/output 240 that can receive signals from, for example, from the scanner 150 (e.g., a signal including scan data obtained by the scanner 150 when scanning the products 190 on the conveyor 120) and/or from the electronic inventory management database 170, and/or from another electronic device (e.g., a hand-held electronic device of a worker) over the network 160. The input/output 240 of the electronic inventory management device 180 can also send signals to the electronic inventory management database 170, for example, a signal indicating an adjustment to inventory at the retail facility 110 (e.g., addition of one or more products to the product inventory offered for sale at the retail facility 110, adjustment to the price of one or more products offered for sale at the retail facility 110, and/or re-allocation of shelf space for certain products at the retail facility 110).

The processor-based control circuit 210 of the electronic inventory management device 180 shown in FIG. 2 is electrically coupled via a connection 245 to a user interface 250, which may include a visual display or display screen 260 (e.g., LED screen) and/or button input 270 that provide the user interface 250 with the ability to permit an operator (e.g., worker at a retail facility 110 where the system 100 is implemented, or a worker at a remote control center) of the electronic inventory management device 180 to manually control the electronic inventory management device 180 by inputting commands via touch-screen and/or button operation and/or voice commands. The user interface 250 of the electronic inventory management device 180 may also include a speaker 280 that provides audible feedback (e.g., alerts) to the user. For example, such manual control by an operator may be via the user interface 250 of the electronic inventory management device 180, via another electronic device of the operator, or via another user interface and/or switch, and may include an option to update inventory information in the electronic inventory management database 170 and/or to access electronic databases of retailer's competitors, for example, to determine the prices charged by the competitors for the consumer-recycled products 190 that are scanned on the conveyor 120 by the scanner 150.

In some embodiments, after the electronic inventory management device 180 identifies the consumer-recycled product 190 scanned by the scanner 150, the control circuit 210 of the electronic inventory management device 180 is programmed to compare data indicating an identity of the consumer-recycled product 190 to the inventory information stored in the electronic inventory management database 170 in association with the products offered for sale at the retail facility 110 in order to determine a total number of times units of the identified consumer-recycled product 190 have been scanned by the scanner 150 at the retail facility 110 within a predetermined time interval. In other words, the electronic inventory management device 180 is configured to obtain, from the electronic inventory management database 170, data indicating how many units of a given product 190 have been recycled by consumers at the retail facility 110.

In one aspect, as will be discussed below, based on such data obtained from the electronic inventory management database 170, the control circuit 210 of the electronic inventory management device 180 is programmed to determine if the total number of times units of a consumer-recycled product 190 were scanned by the scanner 150 at the retail facility 110 within a predetermined time interval exceeds a predetermined scan data threshold (indicative of a statistically significant consumer trend) stored in the electronic inventory management database 170 in association with this consumer-recycled product 190. In one aspect, the control circuit 210 is programmed to determine whether the consumer-recycled product 190 for which a statistically significant consumer trend has been identified is offered for sale at the retail facility 110.

In some aspects, when a statistically significant number of products 190 is recycled at the retail facility 110, the electronic inventory management device 180 is able to detect consumer trends with respect to such products 190 that warrant an analysis and determination of whether an adjustment to the inventory stocked and/or offered for sale at the retail facility 110 should be made in view of the detected consumer trends. In some aspects, the control circuit 210 of the electronic inventory management device 180 is programmed to detect a consumer trend when a predetermined scan data threshold is exceeded with respect to a given consumer-recycled product 190. In other words, the control circuit 210 of the electronic inventory management device 180 is programmed, in some aspects, to recognize a consumer trend with respect to a given consumer-recycled product 190 upon detecting that a predetermined number of units of this product 190 has been recycled by the consumers and scanned by the scanner 150 at the retail facility 110. In some embodiments, after the control circuit 210 of the electronic inventory management device 180 recognizes that a consumer trend which exists with respect to a given consumer-recycled product 190 because this product 190 has been scanned more than a predetermined number of times by the scanner 150, such trend data generated by the control circuit 210 is transmitted over the network 160 to the electronic inventory management database 170 for storage.

Generally, the predetermined scan data thresholds that, if exceeded, are indicative of a consumer trend with respect to a consumer-recycled product 190, are product-type, product-size, and/or product price-specific, and may be determined and preset by a control circuit 210 of the electronic inventory management device 180, or can be determined and preset by a worker (e.g., manager) of the retail facility 110. For example, for large-sized, individually packaged, and/or high-priced products, a scan data threshold that may indicate a consumer trend that warrants an adjustment of inventory at the retail facility 110 can be a low number of scans (e.g., 1-10 scans, 1-20 scans, or 1-50 scans) Conversely, for small-sized and/or bulk packaged, and/or low-priced products, a scan data threshold that may indicate a consumer trend that warrants an adjustment of inventory at the retail facility 110 can be a high number of scans (e.g., 50-100 scans, 100-500 scans, or 500-1000 scans). Further, the predetermined scan data thresholds stored in the electronic inventory management database 170 can be expressed not just in terms of the number of units of a given consumer-recycled product 190 scanned by the scanner 150, but also in terms of the number of units scanned per a predetermined interval of time (e.g., 1 day, 1 week, 2 weeks, 4 weeks, 12 weeks, 52 weeks, etc.). In other words, a predetermined scan data threshold that may indicate a consumer trend for a consumer-recycled product 190 that warrants an adjustment of inventory at the retail facility 110 can be set at 5 scans/day, 10 scans/week, 50 scans/month, or 1000 scans/12 weeks, depending on the type, size, and price of the recycled product 190.

In addition, in some embodiments, the control circuit 210 of the electronic inventory management device 180 is programmed to recognize a consumer trend which exists with respect to a given consumer-recycled product 190 when this product 190 represents at least a certain predetermined threshold percentage of scans of consumer-recycled products 190 within a predetermined interval of time. In other words, a predetermined scan data percentage threshold that may indicate a consumer trend for a consumer-recycled product 190 that warrants an adjustment of inventory at the retail facility 110 can be set at 10% or 15% or 20% or 25% of scans per day or week or month, depending on the type, size, and price of the recycled product 190. In For example, if a predetermined scan data percentage threshold is set a 20% for canned goods, if the control circuit 210 of the electronic inventory management device 180 determines that the number of cans (e.g., 10) of a certain brand of green beans represents 20% of the total number (e.g., 50) of consumer-recycled products 190 scanned in one day, the control circuit 210 is programmed to indicate the presence of a consumer trend with respect to the green beans that warrants an investigation as to whether an adjustment of the inventory (e.g., by adding this brand of green beans to the inventory) of cans of green bees at the retail facility 110 is warranted.

In some embodiments, the control circuit 210 of the electronic inventory management device 180 is programmed to generate an output, based on a determination of whether the determined total number exceeds the predetermined scan data threshold. Such an output, in some aspects, is an indication of whether a consumer trend is present, in association with the consumer-recycled product 190 scanned by the scanner 150 that warrants an adjustment of the inventory at the retail facility 110. In one aspect, an output indicating that a consumer trend is present in association with the consumer-recycled product 190 that warrants an adjustment of the inventory at the retail facility 110 also indicates a proposed adjustment to the inventory at the retail facility 110 that was generated by the control circuit 210 of the electronic inventory management device 180. For example, in some embodiments, the control circuit 210 of the electronic inventory management device 180 is programmed to generate a suggested number of units (50, 100, 1000, etc.) of the consumer-recycled product 190 to be added to the inventory at the retail facility 110.

In some embodiments, the control circuit 210 of the electronic inventory management device 180 is programmed to obtain, via the network 160, the aforementioned inventory data, scan data, and/or trend data stored in the electronic inventory management database 170. In some embodiments, after a consumer-recycled product 190 is scanned by the scanner 190 and the data indicative of the identifying indicia 192 of the product 190 is transmitted to and stored in the electronic inventory management database 170, the control circuit 210 of the electronic inventory management device 180 is programmed to compare the identifying indicia 192 (e.g., a bar code) associated with the consumer-recycled product 190 stored in the scan data obtained from the electronic inventory management database 170 to a listing of uniform product codes (UPC) in order to identify the consumer-recycled product 190 scanned by the scanner 150. In one aspect, such a listing of uniform product codes is stored in the electronic inventory management database 170. In another aspect, such a listing of uniform product codes is stored in a database separate from the electronic inventory management database 170, which is accessed by the electronic inventory management device 180.

In some configurations, after obtaining identifying indicia 192 associated with a consumer-recycled product 190 and identifying such a product 190 (e.g., by cross-referencing the identifying indicia against a UPC listing), the control circuit 210 of the electronic inventory management device 180 is programmed to obtain inventory data stored in the electronic inventory management database 170 that is associated with the products offered for sale at the retail facility 110 in order to determine whether the identified consumer-recycled product 190 corresponds to inventory data identifying a product offered for sale at the retail facility. In other words, in some aspects, after the consumer-recycled product 190 scanned by the scanner 150 is identified, the electronic inventory management device 180 is configured to determine if the consumer-recycled product 190 is part of the inventory that is offered for sale to consumers at the retail facility 110.

In one aspect, after the electronic inventory management device 180 determines that the identifying indicia 192 of the consumer-recycled product 190 does not correspond to the inventory data identifying a product offered for sale at the retail facility 110 (i.e., if the consumer-recycled product 190 is not offered for sale at the retail facility 110), and after the electronic inventory management device 180 determines that a consumer trend is present in association with the consumer-recycled product 190, the control circuit 210 of the electronic inventory management device 180 is programmed to generate a recommendation indicating whether the consumer-recycled product 190 not offered for sale at the retail facility should be (or should not be) offered for sale at the retail facility. For example, when the number of units of a product 190 (not offered for sale at the retail facility 110) recycled and scanned by the scanner 150 at the retail facility 110 exceeds the preset scan threshold determined to be indicative of a statistically significant consumer demand trend with respect to this product 190, the control circuit 210 of the electronic inventory management device 180 is programmed to generate a recommendation that this product 190 be added to the inventory and offered for sale to consumers at the retail facility 110, which is likely to lead to increased profitability of the retail facility 110 (since this product 190 is in high demand).

In some embodiments, after the electronic inventory management device 180 determines that the identifying indicia of the consumer-recycled product 190 corresponds to the inventory data identifying a product offered for sale at the retail facility (i.e., if the consumer-recycled product 190 is offered for sale at the retail facility), the control circuit 210 of the electronic inventory management device 180 is configured to access at least one database of one or more competitor of the retailer in order to obtain prices of the products offered for sale by the competitors. In one aspect, after a determination by the electronic inventory management device 180 that a consumer trend is present in association with a consumer-recycled product 190, the electronic inventory management device 180 is configured to obtain the per unit price of products identical to the consumer-recycled product 190 and offered for sale by one or more competitors of the retail facility 110 in order to determine whether the price per unit of this product 190 offered by the competitor(s) is higher or lower than the price per unit offered at the retail facility 110.

To facilitate such a determination by the electronic inventory management device 180, the inventory data indicative of the products offered for sale at the retail facility 110 (stored in the electronic inventory management database 170) includes the prices of the products offered for sale at the retail facility 110. In some embodiments, after the electronic inventory management device 180 determines if the price of units of products identical to the consumer-recycled product 190 that is offered by one or more competitors of the retail facility 110 is lower than the price per unit of products identical to the consumer-recycled product 190 offered for sale at the retail facility 110, the control circuit 210 of the electronic inventory management device 180 is programmed to generate a report based on the comparative prices of products identical to the consumer-recycled product 190 offered for sale by the retail facility 110 and competitors of the retail facility 110. In one aspect, the control circuit 210 of the electronic inventory management device 180 is programmed to generate a report including a recommendation indicating whether the price per unit of a product identical to the consumer-recycled product 190 that is offered for sale at the retail facility 110 should be lowered in order to make the price for this product at the retail facility 110 more competitive and/or better than the price for this product offered by the competitors.

In some embodiments, the display screen 260 of the electronic inventory management device 180 is configured to display various graphical interface-based menus, options, and/or alerts that may be transmitted from and/or to the electronic inventory management device 180 in connection with various aspects of receiving electronic data from the scanner 150 and/or the electronic inventory management database 170. The inputs 270 of the electronic inventory management device 180 may be configured to permit an operator to navigate through the on-screen menus on the electronic inventory management device 180 and make changes and/or updates to, for example, inventory data stored in the electronic inventory management database 170 based on an inventory adjustment determined by the control circuit 210 of the electronic inventory management device 180. It will be appreciated that the display screen 260 may be configured as both a display screen and an input 270 (e.g., a touch-screen that permits an operator to press on the display screen 260 to enter text and/or execute commands.)

Figure 3:
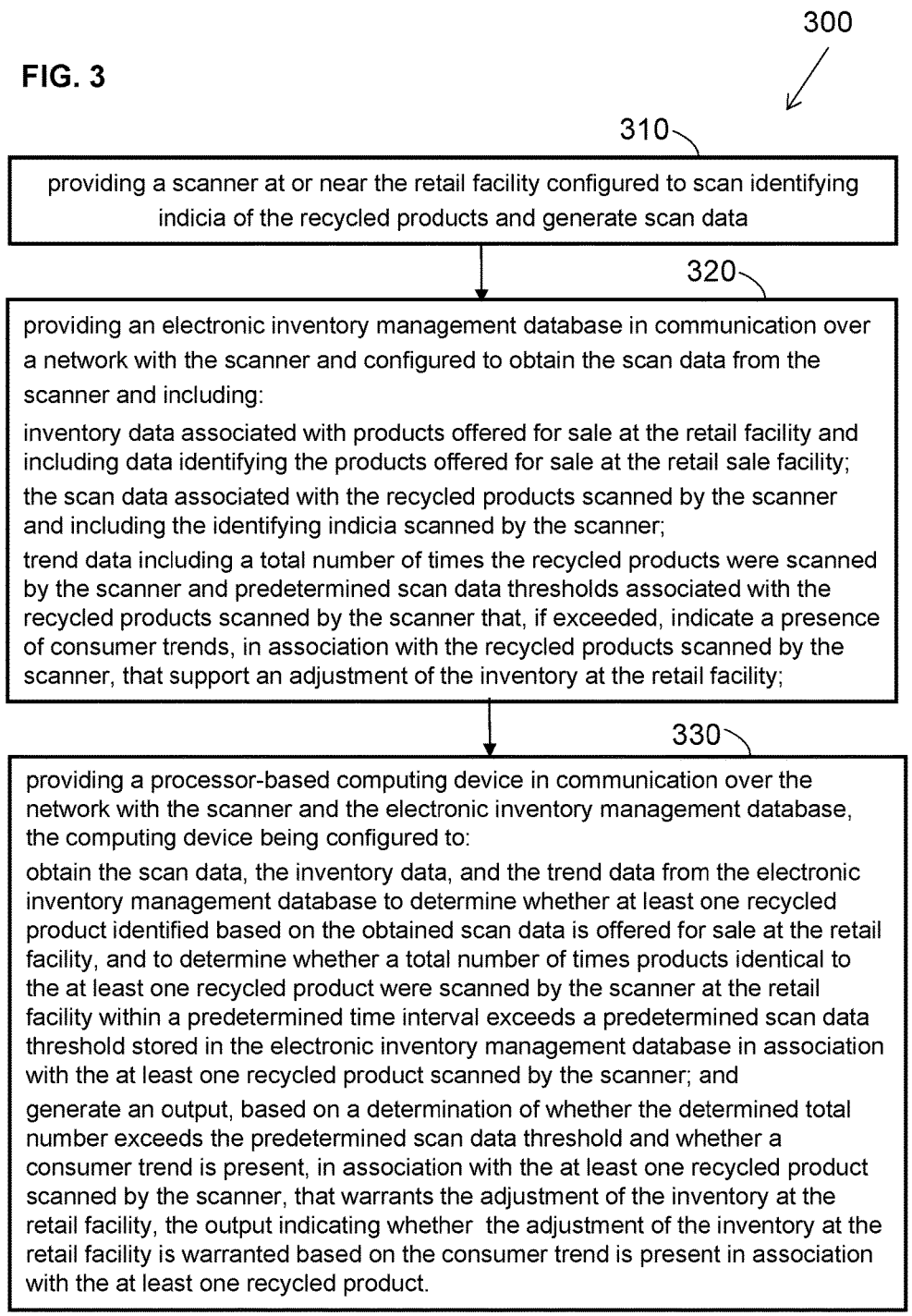
FIG. 3 is a flow chart diagram of a process of analyzing products recycled by consumers at a retail facility to determine trends in the recycled products and adjusting inventory at the retail facility based on the determined trends in accordance with some embodiments.

FIG. 3 shows an embodiment of an exemplary method 300 of analyzing products 190 recycled by consumers at a retail facility 110 of a retailer to determine trends in the recycled products 190 and adjust inventory at the retail facility 110 based on the determined trends. The method 300 includes providing a scanner 150 at or near the retail facility 110 configured to scan identifying indicia 192 of the recycled products 190 and generate scan data (step 310). As described above, the scanner 150 is used, in some embodiments, to scan consumer-recycled products 190 as they travel on the product advancement surface 125 of the conveyor 120, but the products 190 recycled by the consumers can be also scanned by the scanner 150 while they are not moving on the product advancement surface 125 of the conveyor 120. For example, the consumer-recycled products 190 can be scanned by the scanner 150 while they held by a hand of a worker at the retail facility 110, while they are held by a robotic picking arm, or while they are located in a recycling bin 130 (or another receptacle or area of the retail facility 110 where consumer-recycled products 190 can be stored).

The exemplary method 300 further includes providing an electronic inventory management database 170 in communication over a network 160 with the scanner 150 and configured to obtain the scan data from the scanner 150 (step 320). As discussed above, the electronic inventory management database 170, in some embodiments, includes: inventory data associated with products offered for sale at the retail facility 110 (e.g., data identifying the products offered for sale at the retail facility 110); scan data (e.g., identifying indicia 192) associated with the consumer-recycled products 190 scanned by the scanner 150; and trend data including the total number of times units of the consumer-recycled product 190 were scanned by the scanner 150 as well as the predetermined scan data thresholds associated with the consumer-recycled products 190 that, if exceeded, indicate a presence of a statistically significant consumer trend that supports an adjustment of the inventory at the retail facility 110.

As discussed above, as the product 190 moves along the product advancement surface 125 of conveyor 120, the product 190 is scanned by the scanner 150. In one aspect, the scanner 150 detects and obtains one or more identifying indicia 192 associated with the product 190 (e.g., barcode, RFID, etc.). In some embodiments, electronic data that represents the identifying indicia 192 of the consumer-recycled product 190 obtained by the scanner 150 is transmitted over the network 160 to the electronic inventory management database 170 for storage and later retrieval by the electronic inventory management device 180. To that end, the exemplary method 300 of FIG. 3 includes providing a processor-based electronic inventory management device 180 in communication over the network 160 with the scanner 150 and the electronic inventory management database 170 (step 330). In some aspects, after the identifying indicia 192 of the consumer-recycled product 190 is obtained by the scanner 150, and transmitted to and stored in the electronic inventory management database 170, the electronic inventory management device 180 determines the identity of the consumer-recycled product 190 based on the obtained identifying indicia 192 of the consumer-recycled product 190 (e.g., by accessing a UPC listing stored on the electronic inventory management database 170 or a remote UPC database).

In some embodiments, the electronic inventory management device 180 compares the data indicating the identity of the consumer-recycled product 190 to inventory data stored in the electronic inventory management database 170 and indicating a listing of all products offered for sale at the retail facility 110. In some aspects, if this comparison indicates that the consumer-recycled product 190 scanned by the scanner 150 is offered for sale at the retail facility 110, the electronic inventory management device 180 accesses (e.g., via the network 160) an electronic (e.g., website-based) database of one or more competitors of the retail facility 110 to obtain the prices set by the competitors with respect to units of the consumer-recycled product 190.

In one embodiment, after the electronic inventory management device 180 obtains the prices set by the competitors with respect to units of the consumer-recycled product 190, the electronic inventory management device 180 determines whether the price of units of the consumer-recycled product 190 that are offered for sale by the competitors of the retail facility 110 is higher or lower than the price of units of the consumer-recycled product 190 offered for sale at the retail facility 110. Such a "retail facility versus competitors" price comparison by the electronic inventory management device 180 results in the generation, by the electronic inventory management device 180, of a report that indicates a recommendation as to whether the price of the units of the consumer-recycled product 190 offered for sale at the retail facility 110 should be lowered (i.e., to make the prices of products offered for sale at the retail facility 110 better than the competitors' prices), raised, or unchanged. In some embodiments, the report generated by the electronic inventory management device 180 does not include a recommendation as to how the price of the units of the consumer-recycled product 190 offered for sale at the retail facility 110 should be changed, with the report simply providing the trend data and the price data obtained by the electronic inventory management device 180, and enabling a human operator (e.g., a manager of the retail facility 110) to adjust (or not adjust) the price of the units of the consumer-recycled product 190 offered for sale at the retail facility 110 based on this report.

In some aspects, if the comparison of the identifying indicia of the consumer-recycled product 190 to the inventory data stored in the electronic inventory management database 170 indicates that the consumer-recycled product 190 scanned by the scanner 150 is not offered for sale at the retail facility 110, the electronic inventory management device 180 determines whether the number of units of the consumer-recycled product 190 scanned by the scanner 150 indicate the presence of a consumer trend with respect to the consumer-recycled product 190 scanned by the scanner 150 that warrants the adjustment of the inventory at the retail facility 110. In one embodiment, the presence or absence of a consumer trend is determined by the electronic inventory management device 180 based on whether a total number of times units of the consumer-recycled product 190 that were scanned by the scanner 150 at the retail facility 110 within a predetermined time interval exceeds a predetermined scan data threshold stored in the electronic inventory management database 170 in association with the consumer-recycled product 190.

As described above, in some embodiments, the control circuit 210 of the electronic inventory management device 180 is programmed to set predetermined scan data thresholds based on the type, size and/or price of the consumer-recycled products 190. It will be appreciated that in some embodiments, the predetermined scan data thresholds are not generated and preset by the control circuit 210 of the electronic inventory management device 180, but are determined by a worker (e.g., manager) of the retail facility 110. For example, for large-sized and/or high-priced products such as televisions, computers, mobile phones, laser printer toner cartridges, or the like, the control circuit 210 of the electronic inventory management device 180 is programmed in some aspects to set a scan data threshold that supports adding such products to the inventory offered for sale at the retail facility 110 at a relatively low number (e.g., 1-10 or 1-20 or 1-50) scans within a predetermined interval of time (e.g., 1 day, 1 week, 2 weeks, 4 weeks, 12 weeks, etc.). On the other hand, for smaller-sized and/or lower-priced products such as soda cans, shampoo, ball-point pens, and/or cereal boxes, or the like, the control circuit 210 of the electronic inventory management device 180 is programmed in some aspects to set a scan data threshold that supports adding such products to the inventory offered for sale at the retail facility 110 at a high number (e.g., 50-100 or 100-500 or 500-1000) scans within a predetermined interval of time (e.g., 1 day, 1 week, 2 weeks, 4 weeks, 12 weeks, etc.).

For example, based on a predetermined scan data threshold of 20/month stored in the electronic inventory management database 170, the control circuit 210 of the electronic inventory management device 180 is programmed to determine that the recycling of 15 units of a certain high-end laser printer toner by consumers at the retail facility during a given month rises to the level of a consumer trend significant enough for the electronic inventory management device 180 to determine whether this laser printer toner is offered for sale at the retail facility 110 and/or whether the inventory of products offered for sale at the retail facility 110 should be adjusted based on the recognition of the consumer trend for this laser printer toner.

In one aspect, if the laser printer toner determined by the electronic management device 180 to be associated with a consumer trend and not to be offered for sale at the retail facility 110 upon obtaining inventory data from the electronic inventory management database 170, the control circuit 210 of the electronic inventory management device 180 generates a report indicating that the laser printer toner be added to the inventory at the retail facility 110. In another aspect, if the laser printer toner determined by the electronic management device 180 to be associated with a consumer trend and offered for sale at the retail facility 110 upon obtaining inventory data from the electronic inventory management database 170, the control circuit 210 of the electronic inventory management device 180 generates a report indicating whether the price of the laser printer toner offered for sale at the retail facility 110 should be adjusted in view of the prices for this laser printer toner determined by the electronic inventory management device 180 to be offered by competitors of the retail facility 110. In one aspect, if the laser printer toner determined by the electronic management device 180 to be associated with a consumer trend and offered for sale at the retail facility 110, the control circuit 210 of the electronic inventory management device 180 generates a report indicating whether to reallocate shelf space at the retail facility 110 to better feature this laser printer toner to consumers at the retail facility 110.

In another example, based on a predetermined scan data threshold of 100/month stored in the electronic inventory management database 170, the control circuit 210 of the electronic inventory management device 180 is programmed to determine that the recycling of 50 units of a low-end ball-point pen by consumers at the retail facility 110 does not rise to the level of a consumer trend significant enough for the electronic inventory management device 180 to warrant a determination of whether this pen is offered for sale at the retail facility 110 and/or whether the inventory of products offered for sale at the retail facility 110 should be adjusted to include this pen in the inventory, to adjust the price of this pen if it is already in inventory at the retail facility, or to reallocate shelf space at the retail facility 110 to better feature this pen. On the other hand, if 150 units of this pen are recycled at the retail facility 110 and scanned by the scanner 150, the control circuit 210 of the electronic inventory management device 180 is programmed to determine that the recycling of 150 units of a low-end ball-point pen by consumers at the retail facility 110 rises to the level of a consumer trend significant enough for the electronic inventory management device 180 to determine whether this pen is offered for sale at the retail facility 110 and/or whether the inventory of products offered for sale at the retail facility 110 should be adjusted to include this pen in the inventory, to adjust the price of this pen if it is already in inventory at the retail facility, or to reallocate shelf space at the retail facility 110 to better feature this pen.

The systems and methods described herein provide for an analysis of products recycled by the consumers at a retail facility in order to obtain data that can be used to determine whether the consumer-recycled products are indicative of significant trends relative to the inventory offered for sale at the retail facility. This analysis advantageously enables an optimization of inventory at the retail facility relative to its competitors, for example, by expanding the inventory at the retail facility to include units of the consumer-recycled products and/or by adjusting prices of the products already in inventory at the retail facility based on the prices of the consumer-recycled products offered by competitors, and/or by reallocating shelf space at the retail facility to prominently display certain products. Accordingly, the methods and systems described herein can advantageously result in significant profit increases for retail facility operators.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for analyzing products recycled by consumers at a retail facility of a retailer to determine trends in the recycled products and adjust inventory at the retail facility based on the determined trends, the system comprising:

a scanner at or near the retail facility configured to scan identifying indicia of the recycled products and generate scan data;

an electronic inventory management database in communication over a network with the scanner and configured to obtain the scan data from the scanner and including:

inventory data associated with products offered for sale at the retail facility and including data identifying the products offered for sale at the retail facility;

the scan data associated with the recycled products scanned by the scanner and including the identifying indicia scanned by the scanner;

trend data including a total number of times the recycled products were scanned by the scanner and predetermined scan data thresholds associated with the recycled products scanned by the scanner that, if exceeded, indicate a presence of consumer trends, in association with the recycled products scanned by the scanner, that support an adjustment of the inventory at the retail facility; and a processor-based electronic inventory management device in communication over the network with the scanner and the electronic inventory management database, the electronic inventory management device being configured to:

obtain the scan data, the inventory data, and the trend data from the electronic inventory management database to determine whether at least one recycled product identified based on the obtained scan data is offered for sale at the retail facility, and to determine whether a total number of times products identical to the at least one recycled product were scanned by the scanner at the retail facility within a predetermined time interval exceeds a predetermined scan data threshold stored in the electronic inventory management database in association with the at least one recycled product scanned by the scanner; and generate an output, based on a determination of whether the determined total number exceeds the predetermined scan data threshold and whether a consumer trend is present, in association with the at least one recycled product scanned by the scanner, that warrants the adjustment of the inventory at the retail facility, the output indicating whether the adjustment of the inventory at the retail facility is warranted based on the consumer trend is present in association with the at least one recycled product.

2. The system of claim 1, wherein the scanner includes at least one of a motion-detecting sensor, a photo sensor, a radio frequency identification (RFID) sensor, an optical sensor, a barcode sensor, a digital camera sensor, a weight sensor, a volumetric sensor, and a size sensor, and wherein at least one of the electronic inventory management database and the electronic inventory management device is located in at least one of the retail facility and a facility remote to the retail facility.

3. The system of claim 1, wherein the identifying indicia is a bar code, and wherein the electronic inventory management device is configured to compare the bar code in the obtained scan data to a listing of uniform product codes stored in the electronic inventory management database in order to identify the at least one recycled product scanned by the scanner.

4. The system of claim 1, wherein the electronic inventory management device is configured to compare the identifying indicia of the at least one recycled product to the inventory information associated with the products offered for sale at the retail facility in order to determine whether the identifying indicia of the at least one recycled product corresponds to inventory data identifying a product offered for sale at the retail facility.

5. The system of claim 4, wherein, after a determination by the electronic inventory management device that the identifying indicia of the at least one recycled product does not correspond to the inventory data identifying a product offered for sale at the retail facility, and after a determination that the consumer trend is present in association with the at least one recycled product, the electronic inventory management device is configured to generate a recommendation indicating whether the at least one recycled product not offered for sale at the retail facility should be offered for sale at the retail facility.

6. The system of claim 1, wherein the electronic inventory management device is configured, after the electronic inventory management device identifies the at least one recycled product scanned by the scanner, to compare data indicating an identity of the identified at least one recycled product to the inventory information associated with the products offered for sale at the retail facility in order to determine a total number of times products identical to the identified at least one recycled product were previously scanned by the scanner at the retail facility within the predetermined time interval.

7. The system of claim 1, wherein the inventory data associated with the products offered for sale at the retail facility further includes consumer purchases associated with the products offered for sale at the retail facility, and wherein the electronic inventory management device is configured to compare a total number of products offered for sale by the retail facility that are sold within the predetermined time interval to the total number of times products identical to the at least one recycled product were scanned by the scanner within the predetermined time interval.

8. The system of claim 1, wherein the inventory data associated with the products offered for sale at the retail facility further includes prices of the products offered for sale at the retail facility, and wherein the electronic inventory management device is configured to access at least one database of at least one competitor of the retailer in order to obtain prices of the products offered for sale by the at least one competitor.

9. The system of claim 8, wherein, based on a determination by the electronic inventory management device that the consumer trend is present in association with the at least one recycled product, the electronic inventory management device is configured to obtain the prices of products identical to the at least one recycled product and offered for sale by the at least one competitor, and to determine whether the price of the products identical to the at least one recycled product and offered for sale by the at least one competitor is higher or lower than the price of the at least one recycled product offered for sale at the retail facility.

10. The system of claim 9, wherein, after a determination of whether the price of the products identical to the at least one recycled product and offered for sale by the at least one competitor is lower than the price of the at least one recycled product offered for sale at the retail facility, the electronic inventory management device is configured to generate and include in the report a recommendation indicating that the price of the at least one recycled product offered for sale at the retail facility should be lowered.

11. A method for analyzing products recycled by consumers at a retail facility of a retailer to determine trends in the recycled products and adjust inventory at the retail facility based on the determined trends, the method comprising:
  providing a scanner at or near the retail facility configured to scan identifying indicia of the recycled products and generate scan data;
  providing an electronic inventory management database in communication over a network with the scanner and configured to obtain the scan data from the scanner and including:
    inventory data associated with products offered for sale at the retail facility and including data identifying the products offered for sale at the retail facility;
    the scan data associated with the recycled products scanned by the scanner and including the identifying indicia scanned by the scanner;
    trend data including a total number of times the recycled products were scanned by the scanner and predetermined scan data thresholds associated with the recycled products scanned by the scanner that, if exceeded, indicate a presence of consumer trends, in association with the recycled products scanned by the scanner, that support an adjustment of the inventory at the retail facility; and
  providing a processor-based electronic inventory management device in communication over the network with the scanner and the electronic inventory management database, the electronic inventory management device being configured to:
    obtain the scan data, the inventory data, and the trend data from the electronic inventory management database to determine whether at least one recycled product identified based on the obtained scan data is offered for sale at the retail facility, and to determine whether a total number of times products identical to the at least one recycled product were scanned by the scanner at the retail facility within a predetermined time interval exceeds a predetermined scan data threshold stored in the electronic inventory management database in association with the at least one recycled product scanned by the scanner; and
    generate an output, based on a determination of whether the determined total number exceeds the predetermined scan data threshold and whether a consumer trend is present, in association with the at least one recycled product scanned by the scanner, that warrants the adjustment of the inventory at the retail facility, the output indicating whether the adjustment of the inventory at the retail facility is warranted based on the consumer trend is present in association with the at least one recycled product.

12. The method of claim 11, wherein the scanner includes at least one of a motion-detecting sensor, a photo sensor, a radio frequency identification (RFID) sensor, an optical sensor, a barcode sensor, a digital camera sensor, a weight sensor, a volumetric sensor, and a size sensor, and wherein at least one of the electronic inventory management database and the electronic inventory management device is located in at least one of the retail facility and a facility remote to the retail facility.

13. The method of claim 11, wherein the identifying indicia is a bar code, and further comprising, comparing, via the electronic inventory management device, the bar code in the obtained scan data to a listing of uniform product codes stored in the electronic inventory management database in order to identify the at least one recycled product scanned by the scanner.

14. The method of claim 11, further comprising comparing, via the electronic inventory management device, the identifying indicia of the at least one recycled product to the inventory information associated with the products offered for sale at the retail facility in order to determine whether the identifying indicia of the at least one recycled product corresponds to inventory data identifying a product offered for sale at the retail facility.

15. The method of claim 14, wherein, after a determination by the electronic inventory management device that the identifying indicia of the at least one recycled product does not correspond to the inventory data identifying a product offered for sale at the retail facility, and after a determination that the consumer trend is present in association with the at least one recycled product, the method further comprises generating, via the electronic inventory management device, a recommendation indicating whether the at least one recycled product not offered for sale at the retail facility should be offered for sale at the retail facility.

16. The method of claim 11, further comprising comparing, after the electronic inventory management device identifies the at least one recycled product scanned by the scanner, data indicating an identity of the identified at least one recycled product to the inventory information associated with the products offered for sale at the retail facility in order to determine a total number of times products identical to the identified at least one recycled product were previously scanned by the scanner at the retail facility within the predetermined time interval.

17. The method of claim 11, wherein the inventory data associated with the products offered for sale at the retail facility further includes consumer purchases associated with the products offered for sale at the retail facility, and further comprising comparing, via the electronic inventory management device, a total number of products offered for sale by the retail facility that are sold within the predetermined time interval to the total number of times products identical to the at least one recycled product were scanned by the scanner within the predetermined time interval.

18. The method of claim 11, wherein the inventory data associated with the products offered for sale at the retail facility further includes prices of the products offered for sale at the retail facility, and further comprising accessing, via the electronic inventory management device, at least one database of at least one competitor of the retailer in order to obtain prices of the products offered for sale by the at least one competitor.

19. The method of claim 18, wherein, based on a determination by the electronic inventory management device that the consumer trend is present in association with the at least one recycled product, the method further comprises obtaining, via the electronic inventory management device, the prices of products identical to the at least one recycled product and offered for sale by the at least one competitor, and determining whether the price of the products identical to the at least one recycled product and offered for sale by the at least one competitor is higher or lower than the price of the at least one recycled product offered for sale at the retail facility.

20. The method of claim 19, wherein, after a determination of whether the price of the products identical to the at least one recycled product and offered for sale by the at least one competitor is lower than the price of the at least one recycled product offered for sale at the retail facility, the method further comprises generating and including in the report a recommendation indicating that the price of the at least one recycled product offered for sale at the retail facility should be lowered.

\* \* \* \* \*